United States Patent [19]

Burns

[11] Patent Number: 5,739,684

[45] Date of Patent: Apr. 14, 1998

[54] UNITARILY FORMED HUB AND ABS EXCITER RING

[75] Inventor: Robert J. Burns, Vinemont, Ala.

[73] Assignee: Webb Wheel Products, Inc., Cullman, Ala.

[21] Appl. No.: 699,491

[22] Filed: Aug. 19, 1996

[51] Int. Cl.$^6$ .............. G01P 3/488; G01P 3/48; B60T 8/08; B60T 8/60

[52] U.S. Cl. .............. 324/173; 324/207.22; 188/181 R; 384/448

[58] Field of Search .............. 324/207.22, 207.25, 324/173, 174; 188/181 R; 384/448; 310/168

[56] References Cited

U.S. PATENT DOCUMENTS

| | | |
|---|---|---|
| 3,307,423 | 3/1967 | Dansi . |
| 3,848,147 | 11/1974 | Anselmino . |
| 3,887,046 | 6/1975 | Bueler . |
| 3,921,702 | 11/1975 | Ward, III . |
| 3,998,298 | 12/1976 | Fleagle . |
| 4,061,213 | 12/1977 | Davy . |
| 4,120,385 | 10/1978 | Roider . |
| 4,161,120 | 7/1979 | Cloarec . |
| 4,625,838 | 12/1986 | Hopes . |
| 4,698,536 | 10/1987 | Oohori . |
| 5,011,302 | 4/1991 | Mott et al. . |
| 5,067,597 | 11/1991 | Young . |
| 5,129,741 | 7/1992 | Deane . |
| 5,191,284 | 3/1993 | Moretti et al. . |
| 5,263,900 | 11/1993 | Stimson . |
| 5,291,130 | 3/1994 | Kendzior .................. 324/174 |
| 5,332,065 | 7/1994 | Steele et al. . |
| 5,350,041 | 9/1994 | Steele et al. . |
| 5,381,090 | 1/1995 | Alder et al. . |
| 5,424,635 | 6/1995 | Robinson et al. . |

OTHER PUBLICATIONS

Freightliner/WABCO ABS article entitled: Introducing An Anti-Lock Braking System Whose Time Has Come (prior Aug. 1995).

Primary Examiner—Walter E. Snow
Attorney, Agent, or Firm—Mayer, Brown & Platt

[57] ABSTRACT

The invention relates to a wheel or hub for use on vehicles which incorporate an anti-lock braking system. The hub includes a ferrous hub having an outboard and inboard section. A plurality of equidistantly spaced radially extending grooves are formed in the end face of the inboard section of the hub forming a plurality of radially extending pulse teeth, a sensor detects the rotation of the pulse teeth and provides this information to a logic unit of the ABS system.

7 Claims, 2 Drawing Sheets

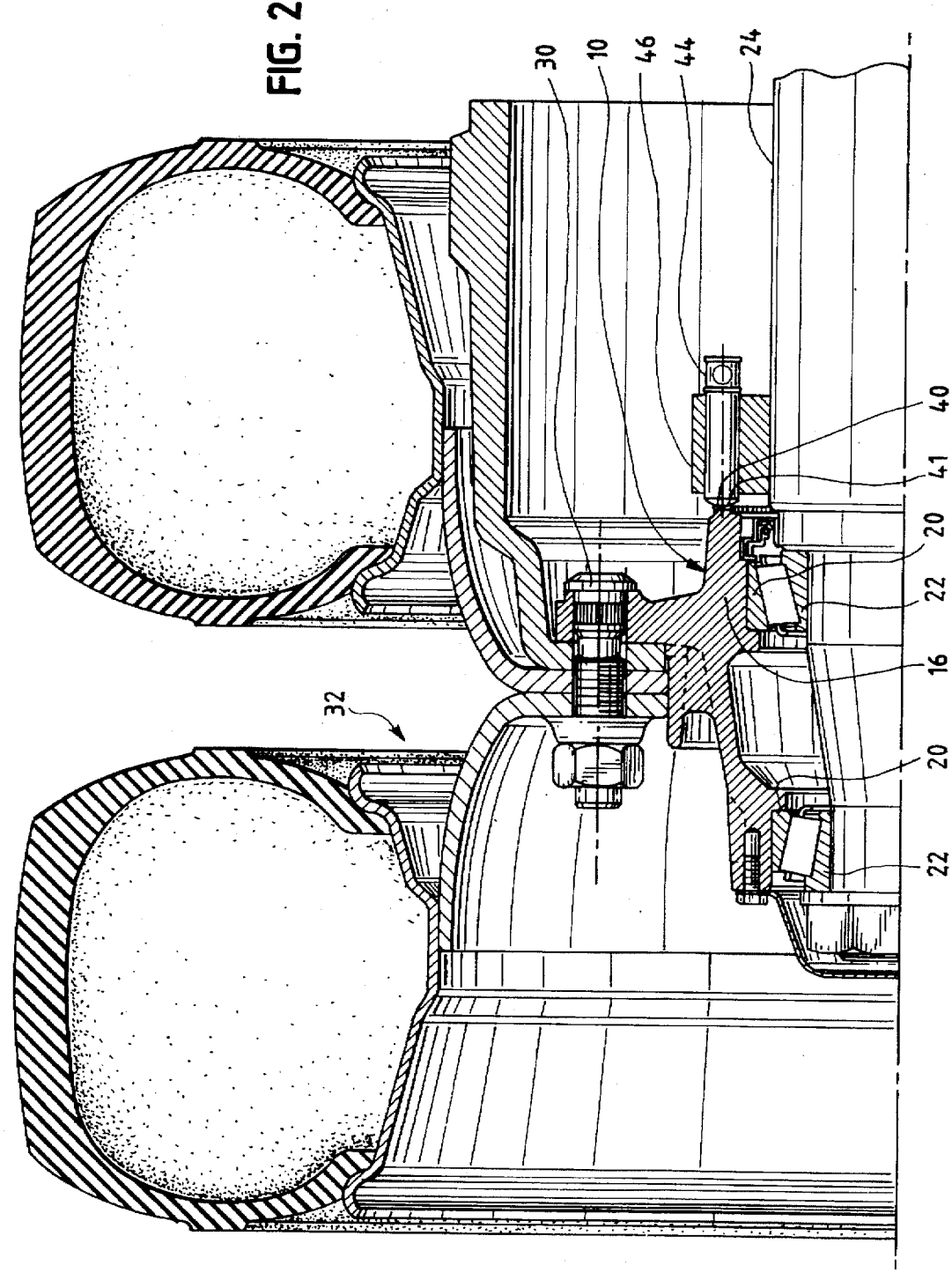

UNITARILY FORMED HUB AND ABS EXCITER RING

FIELD OF THE INVENTION

This invention relates in general to a device used in conjunction with an anti-lock braking system and, in particular, to a wheel or hub having unitarily formed pulse teeth on the inboard face of the wheel or hub for use with an anti-lock braking system.

BACKGROUND OF THE INVENTION

Anti-lock braking systems, commonly referred to as ABS brakes are found increasingly in motor vehicles of all types including trucks. ABS systems function generally by monitoring the relative rotational speed of a hub and using that information to adjust the braking force applied to the brake to avoid lock-up of the wheel during braking. ABS systems generally employ sensors mounted on a non-rotating portion of the axle adjacent a rotating portion of the wheel assembly to determine the relative wheel rotational speed. The relative wheel rotational speed is sent to a logic system which tabulates rotational speed of the wheel to determine whether impending wheel lockup is occurring. Lock-up of a wheel is undesirable during braking as it may result in instability, loss of steering control and increased stopping distances and time.

The prevention of wheel lock-up during braking is relevant in the trucking field, particularly with respect to articulated vehicles where loss of control could cause jack-knifing on slippery roads during braking. ABS systems work in general by taking the signals from the sensors monitoring the wheel speed and therefrom determining whether lock-up is impending. In response to this determination, the ABS system modulates the braking forces to prevent an impending lock-up from occurring.

In most conventional ABS systems, the sensing mechanism used is generally a magnetic pick-up. The sensor is mounted to a stationary portion of the vehicle's axle. The sensor is actuated by a tone wheel or exciter ring which is generally mounted on a rotating hub assembly. The exciter ring includes a series of teeth which project from a surface of the exciter ring. The sensor is mounted adjacent the exciter ring and each time the teeth of the exciter ring rotate past the magnetic pick-up an electrical pulse is generated. The electrical pulse is sent to a logic portion or computer associated with the ABS system. The computer associated with the ABS system then evaluates the pulses to determine the acceleration or deceleration rate of the rotating hub, and if necessary, sends any correction signals required to regulate the braking force to avoid impending wheel lock-up.

ABS systems typically use a cylindrical exciter ring that is formed from powdered metal, machined from a tube, or formed from a strip of steel or other material that includes a number of teeth projecting from the surface thereof. Pulse teeth are formed into a surface of the ring to enable the sensor to detect rotation of the hub. The ring is press fit over a cylindrical surface of the hub so that it will rotate with the hub. The magnetic sensor or pickups are mounted on a non-rotating part of the vehicle such as an axle support or housing adjacent to the exciter ring to detect the rotating teeth.

There are several disadvantages associated with this type of exciter ring. First, it is necessary to maintain precise fits between the hub and the exciter ring. This requires precision machining of the hub as well as the exciter ring which adds considerably to the cost of manufacturing. Even if precise tolerances are maintained when the exciter ring is press fit onto the hub, the exciter ring can get knocked out of alignment and the magnetic pickup or sensor will not function as intended. If precise tolerances are not maintained hoop stresses in the ring could cause the ring to fail and be displaced from its exact location which can also disrupt the proper functioning of the ABS system. The high press fit can also distort the hub bearing or seal bores and cause a loss of function of the hub. Corrosion of the exciter ring also may pose a problem for press fit exciter rings as corrosion may alter the clearance between the pulse teeth and the sensor needed to maintain the ABS system functioning properly.

Another prior art method of attaching the exciter ring to the hub is to insert cast the exciter ring as part of the hub itself. This is generally performed by bonding a steel ring to the non-ferrous hub by insert casting the steel ring in the hub. After casting, the hub is machined to provide the appropriate bearing cup bores, sealing bores and openings for mounting the wheel. The hub is machined still further to expose the pulse teeth around the hub. The major disadvantage to this method of integrally forming the hub and exciter ring is the step of insert casting which is complicated and significantly raises the cost of producing the hub.

Still another prior art method of producing an exciter ring and hub assembly is to simply use a cast hub. Subsequently, the exterior cylindrical surface of the hub is machined to provide the proper clearance between the hub surface and the ABS sensor. Axially extending grooves are then machined into the exterior cylindrical surface of the hub forming axially extending teeth. This method while it does avoid some of the disadvantage associated with press fitting an exciter ring on a hub, still requires several machining steps including precise machining of the hub's outside cylindrical surface to maintain the roundness of the hub surface to insure the proper clearance between the pulse teeth and the sensor. Moreover, the positioning of the axially extending teeth in a load bearing portion of the hub requires additional material in the hub to maintain structural integrity.

SUMMARY OF THE INVENTION

It is a general object of the present invention to provide a hub adapted for use with an ABS system.

It is a further object of the present invention to provide a hub having unitarily formed pulse teeth for use in conjunction with an ABS system.

Still a further object of the present invention is to provide a hub with pulse teeth unitarily formed on the end face of the inboard section of the hub.

Yet another object of the present invention is to provide a hub with radially extending pulse teeth unitarily formed on the end face of the inboard section of the hub.

In accordance with a preferred embodiment of the invention a hub for a motor vehicle having an anti-lock braking system is provided including a ferrous hub having a substantially cylindrical body. The body includes an inboard and outboard section and an annular end face portion on the inboard section. Means are provided for rotatably mounting the hub to a suspension structure of the motor vehicle about an axis of rotation. Radially extending pulse teeth, unitarily formed in the end face of the inboard portion of the hub by a series of radially extending grooves are provided. Rotation of the pulse teeth are detected by a sensor used in conjunction with the anti-lock braking system.

It is to be understood that both the foregoing general description and the following detailed description are exemplary and are intended to provide further explanation of the invention claimed. The accompanying drawings which are incorporated and constitute part of this specification are included to illustrate and provide a further understanding of the device and method of the claimed invention.

BRIEF DESCRIPTION OF THE DRAWINGS

FIG. 2 is side sectional view of the hub of FIG. 1 connected to a motor vehicle axle.

DETAILED DESCRIPTION OF THE PREFERRED EMBODIMENT

Figure 1:
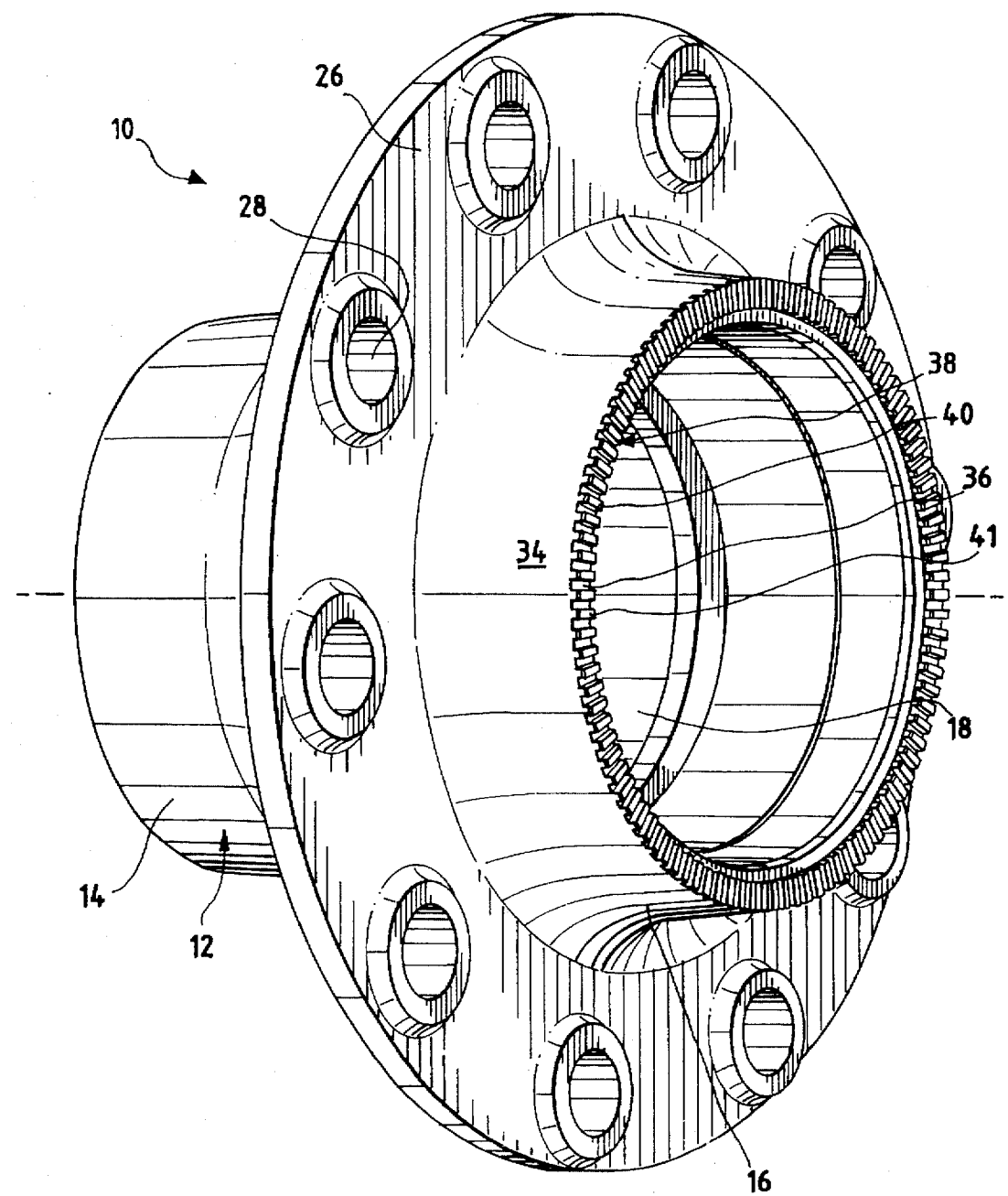
FIG. 1 is a side elevational view of a hub having unitarily formed pulse teeth made in accordance with the principles of the present invention.

A hub with radially extending pulse teeth unitarily formed therewith according to the principles of the present invention is shown in FIG. 1 and generally designated at 10. The term hub is used throughout the application and should be understood as referring to either a spoke wheel or hub of motor vehicles, for example, the hubs or spoke wheels of trucks and trailers. Referring to FIGS. 1 and 2, the hub 10 includes a generally cylindrical body 12, which includes an outboard extension 14 and an inboard extension 16. The cylindrical body 12 defines a substantially cylindrical interior passageway 18 which includes bearing cups 20 which are adapted to engage roller bearing 22 to rotatably mount the hub to the vehicle axle 24 or other suspension component of the vehicle.

The hub 10 also includes a mounting flange 26 extending radially from the cylindrical body 12. The radially extending mounting flange 26 assists in defining the inboard section 16 and outboard section 14 of the hub 10. Equidistantly spaced openings 28 are formed in the mounting flange 26 and are adapted to receive wheel mounting studs 30 for mounting a wheel and tire assembly 32 to the outboard section 14 of the hub 10.

The hub 10 is generally formed as a casting or forging and is made from a ferrous material preferably ductile iron or cast steel. Alternatively, other ferrous materials such as steel forging or austempered ductile iron may be used in forming the hub. The bearing cups bores, sealing bores and openings 28 are machined and drilled to their proper dimensions in a manner well-known in the art. The outside surface 34 of the inboard portion 16 of the hub 10 is not required to be machined for the invention to work in its intended manner. However, the outside surface 34 of the inboard section 16 may be machined for cosmetic purposes.

After the interior dimensions have been machined, as noted above, a plurality of radially extending grooves 36 are formed in the annular end face 38 of the inboard portion 16 of the hub 10 forming a series of radially extending pulse teeth 40. The top surface 41 of the radially extending pulse teeth are preferably coplanar with the end face 38. The grooves 36 are equidistantly spaced about the end face 38 of the inboard hub 16. The grooves 36 and the corresponding pulse teeth 40 are machined, preferably by using super abrasive machining ("SAM") or an abrasive cutter. Alternatively, milling, broaching, laser cutting or other methods of removing metal may be utilized to form the grooves 36.

Referring to FIG. 2, the hub 10 of the present invention is shown mounted on an axle 24. Also shown is a magnetic pick-up or sensor 44 which is held by a bracket 46 to a non-rotating member of the axle 24. The bracket may also be mounted on a portion of the axle support assembly. The sensor 44 is positioned adjacent the end face 38 of the inboard hub 16 and detects the pulse teeth 40 as they pass by the sensor during rotation of the hub 10. The sensor 44 produces an electrical pulse each time a tooth 40 passes. The detection of the teeth 40 and the creation of an electrical pulse by the sensor 44 is well known in the art. Sensors of the type generally used in ABS systems generally employ either variable reluctance or inductive pick up technologies. The electrical pulses produced by the sensor 44 are sent to a logic unit (not shown) of an anti-lock braking system. The logic unit, evaluates the pulses and produces signals to control the braking pressure on that brake.

The sensor 44 when used in conjunction with the preferred embodiment of the present invention may be placed on the axle 24 prior to the mounting of the hub 10 on the axle. Ideally, the position of the sensor 44 should be directly adjacent the teeth 40. The positioning of the unitarily formed pulse teeth 40 on the face 38 of the hub 10 in accordance with the present invention permits the sensor 44 to be mounted on the axle 24 prior to the mounting of the hub. The hub 10 may then be mounted on the axle 24 and used to push the sensor 44 into its proper place directly adjacent the pulse teeth 40. The sensor may then be quickly tightened with no additional need for measuring tolerances or assuring clearances.

One significant advantage of the present invention is that the position of the radially extending grooves 36 and pulse teeth 40 on the end face 38 of the inboard section 16 of the hub, allows the grooves to be formed by abrasive cutting. Use of a large diameter abrasive wheel (commonly referred to as SAM) for use on relatively large diameter hubs is generally not possible when the pulse teeth are placed on the outside surface of the inboard portion 16 of the hub due to the close proximity of the mounting flange 26. Pulse teeth positioned on the outside surface of the inboard hub can only be formed by the use of a milling cutter or by hobbing. These devices are slower and therefore raise the cost of producing the hubs. Moreover, the use of the abrasive cutter to form the pulse teeth 40 on the end face 38 of the inboard portion of the hub eliminates the need for deburring which is a secondary operation necessary when using other processes such as milling cutters and bobbing.

Another advantage to forming the radially extending grooves 36 and corresponding pulse teeth 40 on the end face 38 is that it requires less material to be removed from the hub 10 than placing axially extending grooves in the outside surface, thereby minimizing the removal of supporting material maintaining the structural integrity of the hub. This is extremely important as the material over the inner bearing cup 20 is a load carrying portion of the hub 10. Moreover, sharp corners are required at the top and bottom of the pulse teeth 40 to generate a clean signal for the sensor 44. Sharp corners damage the structural integrity of the load carrying portion of the hub. By placing the sharp corners on a lower stressed area on the end face 38 of the hub 10, oriented perpendicular to the strain in the radial direction, the present invention improves the life of the hub 10 with minimum additional material.

While a preferred embodiment of the hub 10 with unitarily formed pulse teeth has been shown in accordance with the invention, as well as methods of making, it should be apparent to those skilled in the art that what has been described is considered at the present to be a preferred embodiment. In accordance with the patent statutes, changes may be made in the hub in its operation in accordance with this invention without actually departing from the true spirit and scope of this invention. The following claims are intended to cover all such changes and modifications which fall in the true spirit and scope of this invention.

What is claimed is:

1. A hub for a motor vehicle having an anti-lock braking system, said hub comprising:

a ferrous hub having a substantially cylindrical body, said cylindrical body including an inboard section and an outboard section, a mounting flange extending from said cylindrical body to mount a rim for a tire, said inboard section of said cylindrical bevy including an annular end face;

means for mounting said hub to an axle of the motor vehicle for rotation about an axis of rotation; and a plurality of radially extending grooves unitarily formed in the end face of the inboard section of the hub, said grooves defining a plurality of radially extending pulse teeth therebetween coincidental with said annular end face.

2. The hub of claim 1 wherein said radially extending grooves are formed by high speed abrading of the end face of the inboard section of the hub.

3. The hub of claim 1 wherein said pulse teeth are coincidental with said end face of the inboard section of said hub.

4. The hub of claim 1 wherein the radially extending grooves extend through the entire radial thickness of inboard section of the hub.

5. The hub of claim 1 which includes a sensor for detecting rotation of the hub, said sensor movable by said hub between an initial position disposed on a non-rotating portion of an axle of said motor vehicle and a working position directly adjacent said radially extending teeth of said hub when said hub is mounted to said suspension structure.

6. The hub of claim 1 wherein said grooves are equidistantly positioned about said end face and extend radially between an inner surface of said cylindrical body and an outer surface of said cylindrical body.

7. A hub for a motor vehicle having an anti-lock braking system and a sensor in combination comprising:

a ferrous hub having a substantially cylindrical body of predetermined radial thickness, said cylindrical body including a radial mounting flange defining an inboard section and an outboard section of said cylindrical body, said inboard section including an annular end face;

means for mounting said hub to a suspension structure of the motor vehicle for rotation about an axis of rotation;

a plurality of radially extending grooves unitarily formed in the end face of the inboard section of the hub, said grooves defining a plurality of radially extending pulse teeth therebetween; and a sensor for detecting rotation of the hub said sensor movable by said hub between an initial position disposed on a non-rotating portion of an axle of said motor vehicle, and a working position directly adjacent said radially extending teeth of said hub when said hub is mounted to said suspension structure.

* * * * *

UNITED STATES PATENT AND TRADEMARK OFFICE
CERTIFICATE OF CORRECTION

PATENT NO.    : 5,739,684
DATED         : April 14, 1998
INVENTOR(S)   : Burns

Page 1 of 1

It is certified that error appears in the above-identified patent and that said Letters Patent is hereby corrected as shown below:

<u>Column 5,</u>
Lines 7-8, the phrase "including an annular end face" should not be italicized. Please replace claim 1 as follows:

-- 1. A hub for a motor vehicle having an anti-lock braking system, said hub comprising:
a ferrous hub having a substantially cylindrical body, said cylindrical body
    including an inboard section and an outboard section, a mounting flange extending from said cylindrical body to mount a rime for a tire, said inboard section of said cylindrical [bevy] *body,* including an annular end face, *and wherein said inboard section is continuously smooth from the mounting flange to the annular end face;*
means for mounting said hub to an axle of the motor vehicle for rotation about an
    axis of rotation; and
a plurality of radially extending grooves unitarily formed in the end face of the
    inboard section of the hub, said grooves defining a plurality of radially extending pulse teeth therebetween coincidental with said annular end face. --

Signed and Sealed this

First Day of October, 2002

*Attest:*

JAMES E. ROGAN
*Director of the United States Patent and Trademark Office*

*Attesting Officer*

UNITED STATES PATENT AND TRADEMARK OFFICE
CERTIFICATE OF CORRECTION

PATENT NO.    : 5,739,684
DATED         : April 14, 1998
INVENTOR(S)   : Robert J. Burns It is certified that error appears in the above-identified patent and that said Letters Patent is hereby corrected as shown below:

This certificate supersedes Certificate of Correction issued October 1, 2002, the number was erroneoulsy mentioned and should be vacated since no Certificate of Correction was granted.

Signed and Sealed this

Eleventh Day of February, 2003

JAMES E. ROGAN
*Director of the United States Patent and Trademark Office*

UNITED STATES PATENT AND TRADEMARK OFFICE
CERTIFICATE OF CORRECTION

PATENT NO. : 5,739,684 C1
DATED : June 18, 2002
INVENTOR(S) : Burns

It is certified that error appears in the above-identified patent and that said Letters Patent is hereby corrected as shown below:

Column 5,
Lines 7-8, the phrase "including an annular end face" should not be italicized.
Please replace claim 1 as follows:

-- 1. A hub for a motor vehicle having an anti-lock braking system, said hub comprising:
a ferrous hub having a substantially cylindrical body, said cylindrical body
   including an inboard section and an outboard section, a mounting flange extending from said cylindrical body to mount a rime for a tire, said inboard section of said cylindrical [bevy] *body*, including an annular end face, *and wherein said inboard section is continuously smooth from the mounting flange to the annular end face;*
means for mounting said hub to an axle of the motor vehicle for rotation about an axis of rotation; and
a plurality of radially extending grooves unitarily formed in the end face of the inboard section of the hub, said grooves defining a plurality of radially extending pulse teeth therebetween coincidental with said annular end face. --

Signed and Sealed this

Twenty-fifth Day of February, 2003

JAMES E. ROGAN
*Director of the United States Patent and Trademark Office*

(12) REEXAMINATION CERTIFICATE (4601st)
United States Patent
Burns

(10) Number: US 5,739,684 C1
(45) Certificate Issued: Jun. 18, 2002

(54) UNITARILY FORMED HUB AND ABS EXCITER RING

(75) Inventor: Robert J. Burns, Vinemont, AL (US)

(73) Assignee: Webb Wheel Products, Inc., Cullman, AL (US)

Reexamination Request:
No. 90/005,392, Jun. 15, 1999

Reexamination Certificate for:
Patent No.: 5,739,684
Issued: Apr. 14, 1998
Appl. No.: 08/699,491
Filed: Aug. 19, 1996

(51) Int. Cl.[7] .................... G01P 3/488; G01P 3/48; B60T 8/08; B60T 8/60
(52) U.S. Cl. .............. 324/173; 324/207.22; 188/181 R; 384/448
(58) Field of Search .................. 324/173, 174, 324/207.22, 207.25; 188/18 R, 181 R; 384/448; 310/168

(56) References Cited

U.S. PATENT DOCUMENTS

| | | | | |
|---|---|---|---|---|
| 4,907,445 A | * | 3/1990 | Okumura | 324/174 |
| 5,240,333 A | * | 8/1993 | Hassiotis et al. | 384/448 |
| 5,350,041 A | * | 9/1994 | Steele et al. | 188/18 R |

* cited by examiner

*Primary Examiner*—Walter Snow

(57) ABSTRACT

The invention relates to a wheel or hub for use on vehicles which incorporate an anti-lock braking system. The hub includes a ferrous hub having an outboard and inboard section. A plurality of equidistantly spaced radially extending grooves are formed in the end face of the inboard section of the hub forming a plurality of radially extending pulse teeth, a sensor detects the rotation of the pulse teeth and provides this information to a logic unit of the ABS system.

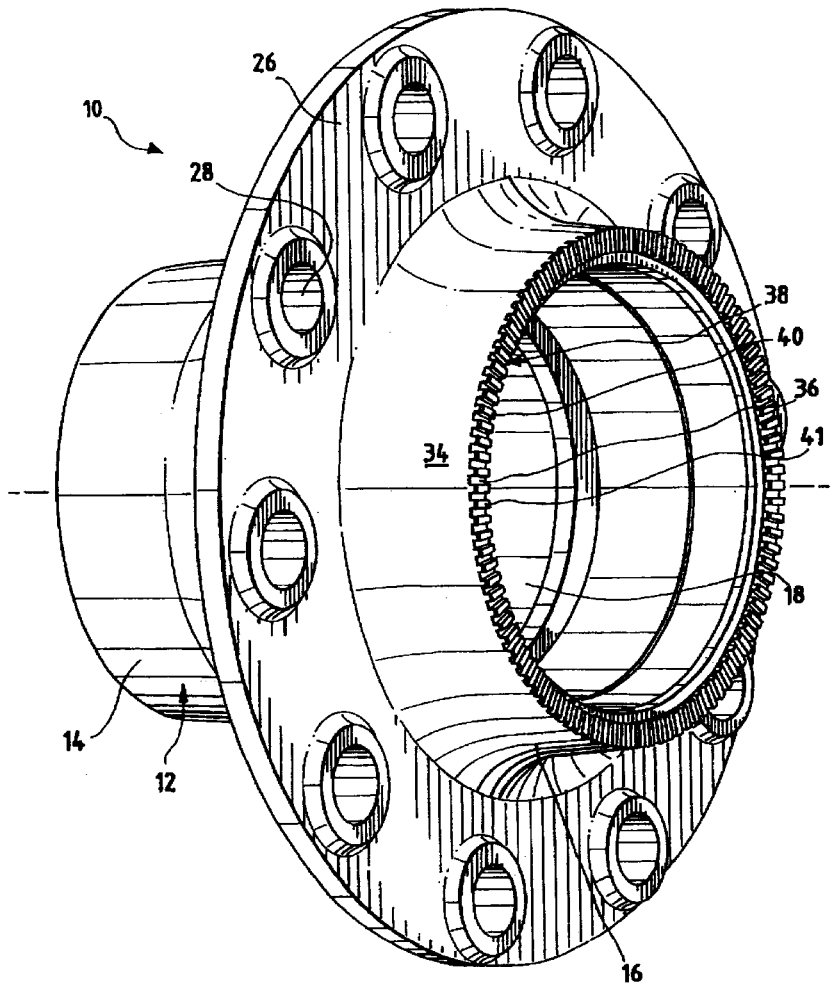

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 1, 2, 4, 5 and 7 are determined to be patentable as amended.

Claims 3 and 6, dependent on an amended claim, are determined to be patentable.

1. A hub for a motor vehicle having an anti-lock braking system, said hub comprising:
   a ferrous hub having a substantially cylindrical body, said cylindrical body including an inboard section and an outboard section, a mounting flange extending from said cylindrical body to mount a rim for a tire, said inboard section of said cylindrical [bevy] *body including an annular end face, and wherein said inboard section is continuously smooth from the mounting flange to the annular end face*;
   means for mounting said hub to an axle of the motor vehicle for rotation about an axis of rotation; and
   a plurality of radially extending grooves unitarily formed in the end face of the inboard section of the hub, said grooves defining a plurality of radially extending pulse teeth therebetween coincidental with said annular end face.

2. [The hub of claim 1] *A hub for motor vehicle having an anti-lock braking system, said hub comprising:*
   *a ferrous hub having a substantially cylindrical body, said cylindrical body including an inboard section and an outboard section, a mounting flange extending from said cylindrical body to mount a rim for a tire, said inboard section of said cylindrical body including an annular end face, and wherein said inboard section is continuosuly smooth from the mounting flange to the annular end face;*
   *means for mounting said hub to an axle of the motor vehicle for rotation about an axis of rotation; and*
   *a plurality of radially extending grooves unitarily formed in the end face of the inboard section of the hub, said grooves defining a plurality of radially extending pulse teeth therebetween coincidental with said annular end face;*
   wherein said radially extending grooves are formed by high speed abrading of the end face of the inboard section of the hub.

4. The hub of claim 1 wherein the radially extending grooves extend through the entire radial thickness of *the* inboard section of the hub.

5. The hub of claim 1 which includes a sensor for detecting rotation of the hub, said sensor *being* movable by said hub between an initial position disposed on a non-rotating portion of an axle of said motor vehicle and a working position directly adjacent said radially extending teeth of said hub when said hub is mounted to said suspension structure.

7. A hub for a motor vehicle having an anti-lock braking system and a sensor in combination comprising:
   a ferrous hub having a substantially cylindrical body of predetermined radial thickness, said cylindrical body including a radial mounting flange defining an inboard section and an outboard section of said cylindrical body, said inboard section including an annular end face*, and wherein said inboard section is continuously smooth from the mounting flange to the annular end face*;
   means for mounting said hub to a suspension structure of the motor vehicle for rotation about an axis of rotation;
   a plurality of radially extending grooves unitarily formed in the end face of the inboard section of the hub, said grooves defining a plurality of radially extending pulse teeth therebetween; and
   a sensor for detecting rotation of the hub*,* said sensor movable by said hub between an initial position disposed on a non-rotating portion of an axle of said motor vehicle, and a working position directly adjacent said radially extending teeth of said hub when said hub is mounted to said suspension structure.

* * * * *